United States Patent [19]

Fitts et al.

[11] Patent Number: 4,866,557
[45] Date of Patent: Sep. 12, 1989

[54] LOW LEVEL VOLTAGE PROGRAMMABLE LOGIC CONTROL

[76] Inventors: James Fitts, 5888 Baer Rd., Sanborn, N.Y. 14132; William Penniston, 5288 Woodland Heights, Olcott, N.Y. 14126

[21] Appl. No.: 7,642

[22] Filed: Jan. 28, 1987

[51] Int. Cl.$^4$ .............................................. H02H 3/08
[52] U.S. Cl. ......................................... 361/96; 361/97
[58] Field of Search ..................... 361/87, 93, 94, 96, 361/42, 44, 48

[56] References Cited

U.S. PATENT DOCUMENTS 4,442,472  4/1984  Pong et al. ............................. 361/96
4,689,712  8/1987  Demeyer ................................ 361/96

Primary Examiner—Derek S. Jennings
Attorney, Agent, or Firm—Eugene J. A. Gierczak

[57] ABSTRACT

A universal programmable logic control device for monitoring the current of a circuit and for signalling a circuit control device, such programmable logic control device including; electrical power circuitry for activating the circuit control device; electrical circuitry for monitoring the current in the electrical circuit, such electrical circuitry including, adjustable electrical signal input circuitry to match the programmable logic control device to the electrical current in the circuit, adjustable pick-up circuitry for adjusting the level of the current monitored in the electrical circuit, adjustable time circuitry for adjusting the time duration of the selected level of electrical current, so as to command the electrical power circuitry to activate the control device when the electrical current in the electrical circuit reaches the selected level and time duration; and a zenor diode in reverse mode for controlling the level of voltage applied to the adjustable pick-up circuitry and time circuitry substantially without resistive burden, the zenor diode in reverse mode passing a reference voltage which is less than an input voltage to the said device.

14 Claims, 15 Drawing Sheets

| CT'S | AMP_TAP_RANGES |
|---|---|
| 100A | 55 |
|  | 75 |
|  | 100 |
| 200A | 100 |
|  | 150 |
|  | 200 |
| 800A | 400 |
|  | 675 |
|  | 800 |
| 1600A | 800 |
|  | 1200 |
|  | 1600 |
| 4000A | 2000 |
|  | 3000 |
|  | 4000 |

GROUND_RATINGS 100A
300A
600A
800A
1000A
1200A

FIGURE 12

LOW LEVEL VOLTAGE PROGRAMMABLE LOGIC CONTROL

FIELD OF INVENTION

This invention relates to a universal low level voltage programmable logic control for protecting electrical power systems against damage caused by overloads and faults, and particularly relates to a programmable, logic control that activates a circuit breaker or trip device.

BACKGROUND TO THE INVENTION

Circuit breakers are commonly used for protecting electrical circuits and devices from damage due to circuit overloads and ground faults. Circuit breakers embodying thermal and magnetic mechanisms have heretofore been used to trip the circuit breaker upon over current conditions. Some of these earlier devices included interchangeable trip units so as to provide trip current ratings that could be changed without changing the entire circuit breaker.

Furthermore, shunt trip mechanisms have been developed to co-ordinate and provide interaction between circuit breakers on complex electrical distribution circuits so that circuit breakers on different parts of the electrical system would trip at different levels and different time delays upon the occurrence of electrical faults.

For example, U.S. Pat. No. 3,826,951 disclosed a shunt trip mechanism which utilized electronic circuits to analyze an electrical signal produced by a sensing device such as a current transformer to generate a trip command to a shunt trip mechanism upon occurrence of an electrical fault.

Circuit parameters which have heretofore been monitored in order to activate such trip devices include:
 (a) the level of fault current
 (b) ground fault detection
 (c) the maximum level of continuous current the circuit interrupter can withstand without damage In order to minimize the cost in providing different circuit interrupters, various types of circuit interrupters having mechanical interchangeable circuit configurations have been developed.

For example, U.S. Pat. No. 4,210,887 discloses a circuit interrupter having interchangeable trip circuits removably disposed in a circuit interrupter housing and connected between a current transformer and a trip mechanism and includes rejection structure to ensure that only trip unit housing circuitry compatible with the electrical characteristics of the circuit interrupter can be inserted into the housing.

Some devices utilize several current transformers in order to monitor a range of electrical characteristics whereby each current transfer used in association with the electrical device provide a portion of the range of electrical characteristics monitored. Other devices utilize several devices in association with current transformers in order to monitor a range of electrical characteristics of an electrical system whereby each device provides a portion of the range of electrical characteristics monitored.

Such structures, however, present relatively complicated devices.

It is an object of this invention to provide a programmable logic control which is simple to construct and use.

It is a further object of this invention to provide a programmable logic control which has greater accuracy and selectivity than other circuit interrupting devices.

FEATURES OF THE INVENTION

The broadest aspect of this invention relates to a universal programmable logic control device for monitoring the current of a circuit and for signalling a control device, said programmable logic control device including; electrical power circuitry for activating said control device; electrical circuitry for monitoring said current in the electrical circuit said, such electrical circuitry including, adjustable electrical signal input circuitry to match the programmable logic control device to the electrical current in said circuit, adjustable pick-up circuitry for adjusting the level of the current monitored in the electrical circuit, and adjustable time circuitry for adjusting the time duration of the selected level of electrical current, so as to command the electrical power circuitry to activate the control device when the electrical current in the electrical circuit reaches the selected level and time duration and means for controlling the level of voltage applied to the adjustable pick-up circuitry and time circuitry substantially without resistive burden, said means passing a reference voltage which is less than an input voltage to said means.

Another aspect of this invention relates to a universal programmable logic control device for monitoring the electrical current in a circuit, and for signalling a trip device for activating a circuit breaker in the electrical circuit, including; electrical power circuitry for activating the circuit breaker; electrical circuitry for monitoring the value of current in the electrical circuit, said electrical circuitry including, adjustable ampere taps to match such universal programmable logic control device to the electrical current in said circuit, adjustable pick-up circuitry for adjusting the level of current monitored in the electrical circuit, adjustable time circuitry for adjusting the time duration of the selected level of current, so as to command said electrical power circuitry to activate said circuit breaker when said current in said electrical circuit reaches said selected said level and time duration and means for controlling the level of voltage applied to the adjustable pick-up circuitry and time circuitry substantially without resistive burden, said means passing a reference voltage which is less than an input voltage to said means.

Yet another aspect of this invention relates to a universal programmable logic control device for monitoring the current of a circuit and for signalling a control device, said programmable logic control device including: electrical power circuitry for activating said control device; electrical circuitry for monitoring said current in the electrical circuit, said electrical circuitry including adjustable pick-up circuitry for adjusting the level of current monitored in the electrical circuit, and adjustable time circuitry for adjusting the duration of the selected level of electrical current so as to command the electrical power circuitry to activate the control device when the electrical current in the electrical circuit reaches the selected level and time duration; and means for controlling the level of voltage applied to the adjustable pick-up circuitry and time circuitry substantially without resistive burden, said means passing a reference voltage which is less than an input voltage to said means.

DESCRIPTION OF THE DRAWINGS

FIG. 12 is a table showing the ampere taps ranges available for various current transformer ratings for the programmable logic trip device.

DETAILED DESCRIPTION OF THE INVENTION

Identical parts have been given identical numbers throughout the figures.

Figure 1:
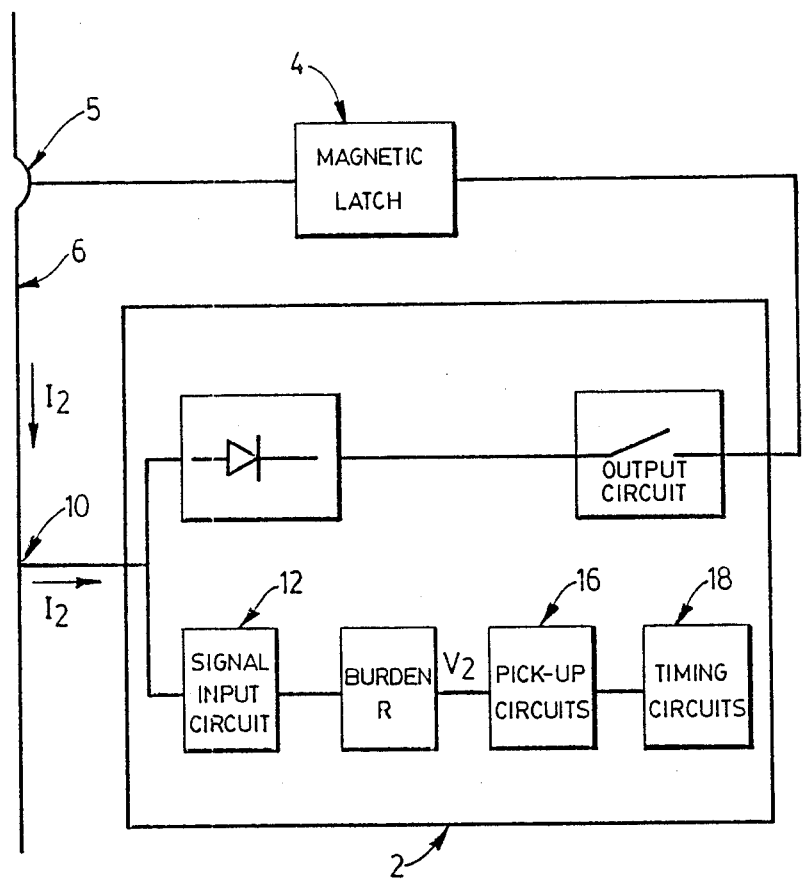
FIG. 1 is a schematic view of the programmable logic control device.

FIG. 1 discloses generally the programmable logic control device 2 which controls or commands a control device such as the trip device 4 which is a magnetic latch which trips the circuit breaker 5 in the case of abnormal conditions in the electrical conductor 6 of an electrical power system (not shown). It should be noted however that the programmable logic control device 2 could also be utilized to signal other control devices to activate light switches or other switches to activate electrical motors or the like.

The programmable logic control device 2 is connected to an electrical sensing device mounted on the conductor 6, namely, a sensor 10. Such sensors 10 typically consists of a current transformer which is well-known to those persons skilled in the art. Such sensor 10 is connected to the programmable logic control device 2 by suitable electrical wiring.

The programmable logic control device 2 includes a signal input circuit 12, a burden resister R, pick-up circuits 16 and timing circuits 18 generally depicted in FIG. 1 and more fully particularized in FIGS. 2 to 11 inclusive.

The sensor 10 supplies the programmable logic control device 2 with a signal $I_2$ which is proportional to the primary current $I_1$ in the electrical conductor 6. The sensor 10 also provides the bias-power required to operate the circuit trip device 4 and the circuitry of the programmable logic control device 2. The sensor 10 is switched to the trip device 4 to open the circuit breaker 5 when the primary current $I_1$ exceeds the selected magnitude and time-delays as more fully particularized herein. The trip device or magnetic latch 4 is powered by the line over current through the sensor 10 and the programmable logic control device.

Furthermore it has been found that by separating the power box from the control board harmonics are substantially reduced or filtered out.

The secondary current $I_2$ is rectified in the programmable logic control device 2 and is burdened with a resistor R which is selected by selection of suitable ampere-tap plugs. The ampere-taps available for the programmable logic control device 2 do not depend on the frame size of the circuit breaker and are listed in FIG. 5. As can be seen from FIG. 5 the ampere tap plugs utilized in the programmable logic control device 2 for the transformer current ratings illustrated in FIG. 5 can be utilized to modify the current rating by a ratio of 0.5, 0.75 or 1.0. In other words if we are monitoring a 3000 amp conductor 6 we would utilize a 4000 amp current transformer and select the appropriate ampere tap plug of RB1, RB2, RB3 illustrated in FIG. 2 at 0.75 in order to monitor a primary current of 3000 amps through conductor 6.

Similarily a 300 amp primary current $I_1$ could be monitored by utlizing a 600 amp current transformer and an ampere tap multiple of 0.5.

By utilizing different ampere-taps, as described herein, the programmable logic control device 2 is capable of monitoring and controlling circuits having a wide range of current characteristics which may be easily and quickly changed so as to accommodate a great variety of current ranges.

Once the appropriate ampere-taps have been selected as described herein, a voltage $V_2$ is developed across the burden resistor R which voltage is proportional to both the primary current $I_1$ and secondary current $I_2$.

The electrical pick up circuits are activated by $V_2$ if it exceeds a particular selected level.

The electronic pick-up circuits 16 consist of Long Time Pick-up, Short Time Pick-up, Instantaneous Pick-up, and Ground Pick-up, as are more fully described herein.

If any of the electronic pick-up circuits 16 are activated then the time delay circuits 18 are activated to determine that $V_2$ and therefore $I_1$ have persisted for a pre-determined and selected time interval.

At the expiration of the delayed time, the output circuit is triggered so as to enable the power supply from sensor 10 to activate the magnetic latch 4 and thereby opening the circuit breaker 5.

Figure 2:
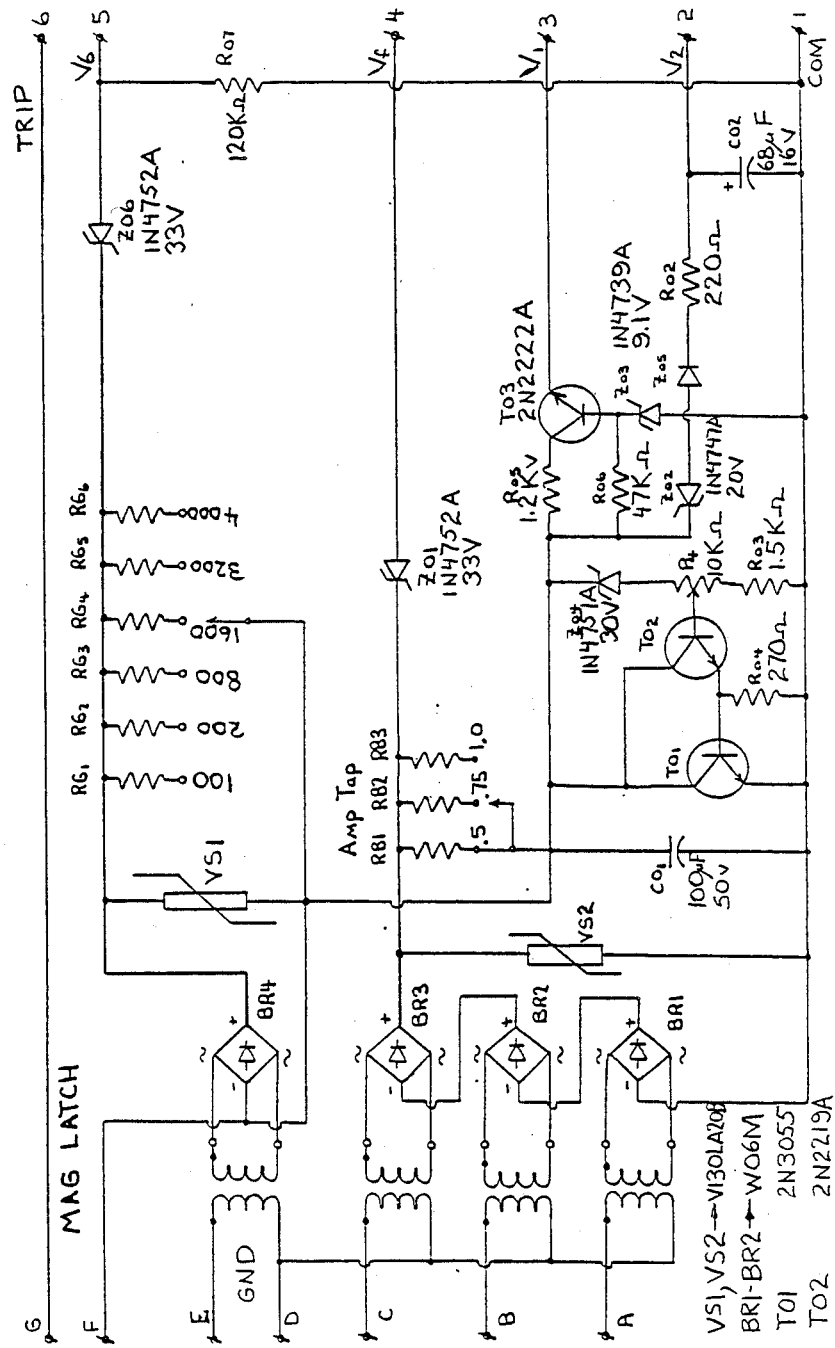
FIG. 2 is a detailed electrical circuit drawing of the comparator circuitry.
Figure 3:
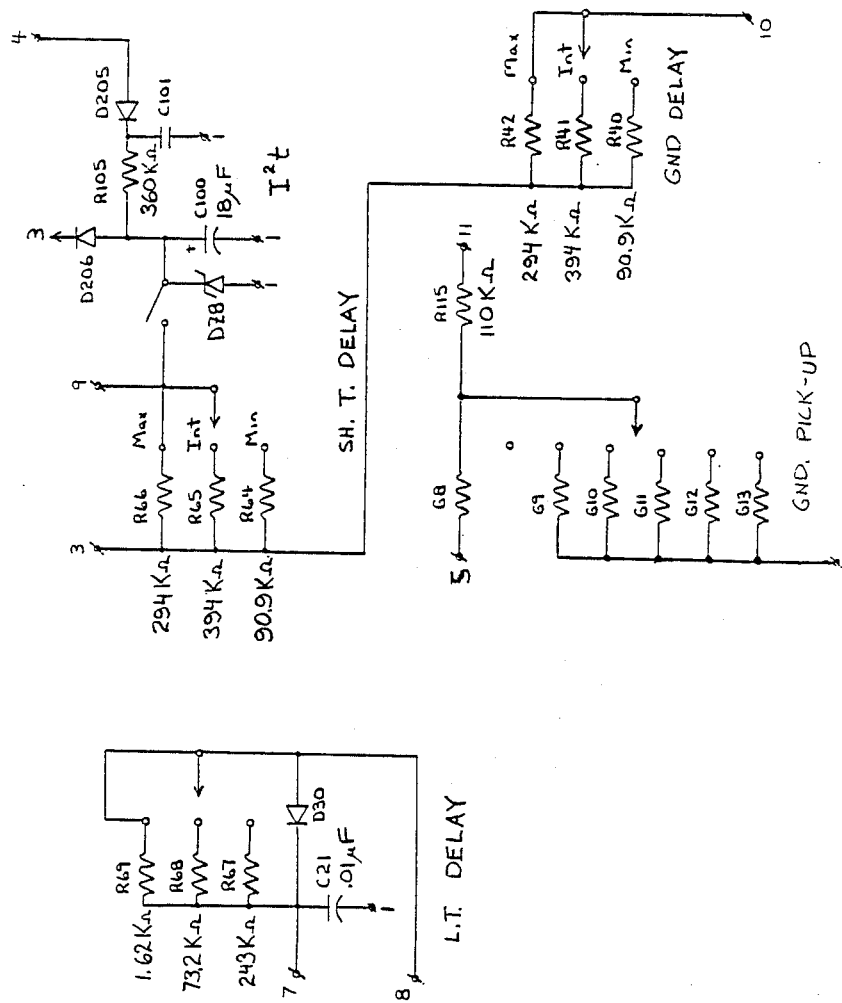
FIG. 3 is a detailed electrical circuitry of the long time delay short time delay, ground pick-up and ground delay circuitry of the programmable local control device.
Figure 4:
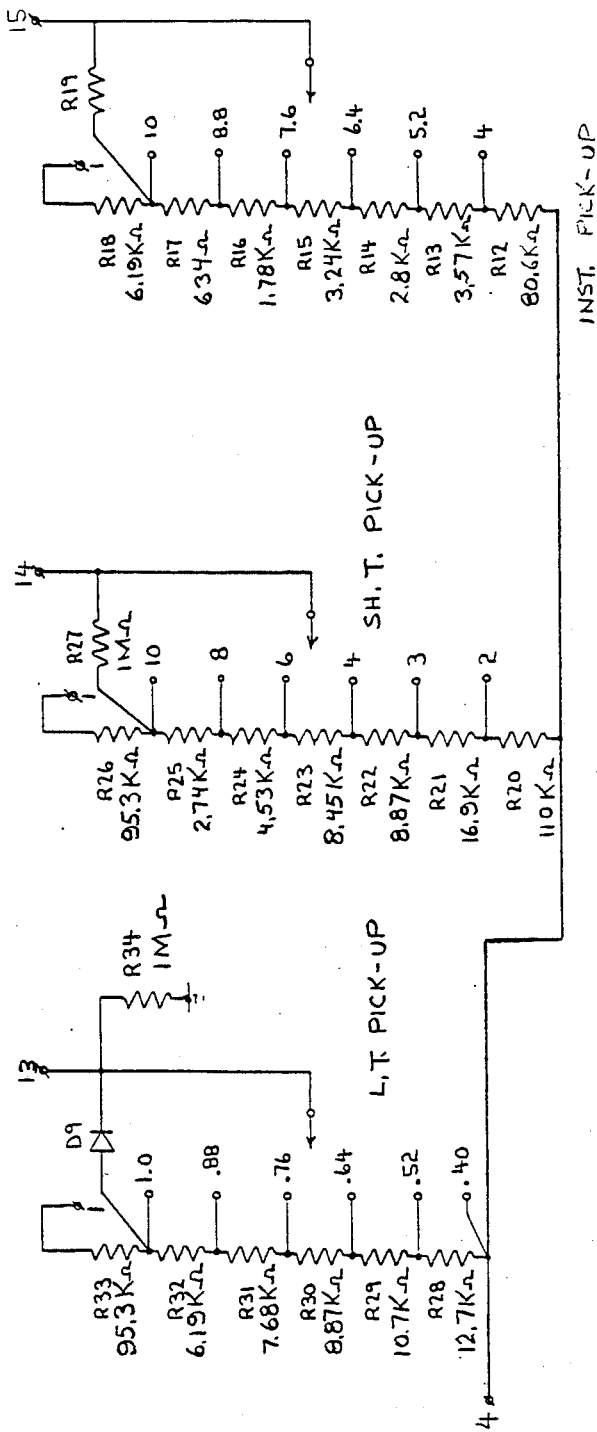
FIG. 4 is a detailed drawing of the long circuitry of the programmable logic trip device.
Figure 5:
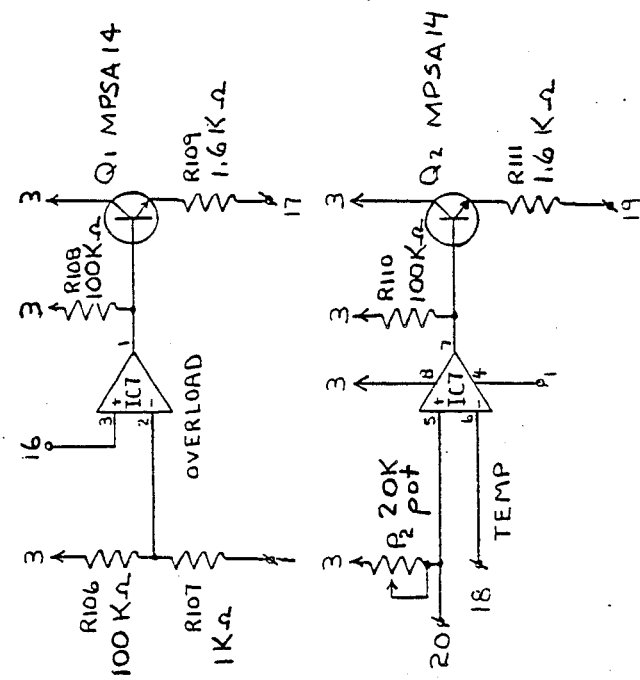
FIG. 5 is a detailed electrical circuit drawing for the light emitting diode.
Figure 6:
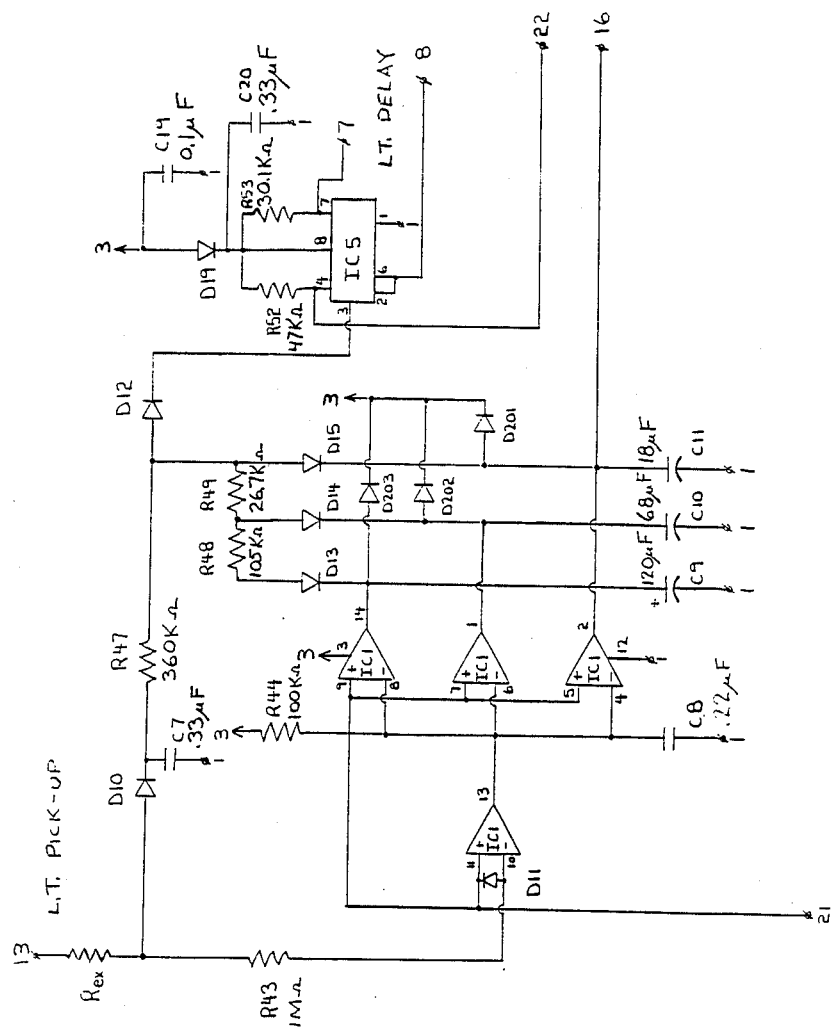
FIG. 6 is a detailed electrical circuit drawing of the long time pick-up circuitry of the programmable logic control device.
Figure 7:
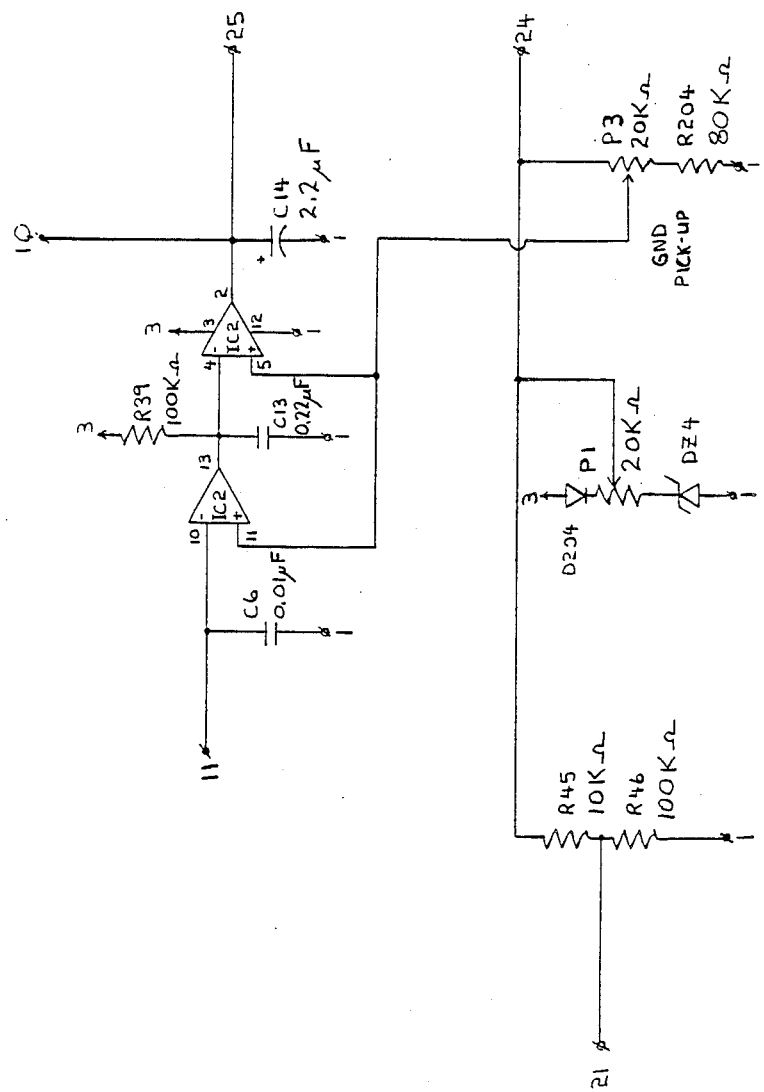
FIG. 7 is a detailed electrical circuit drawing of the reference voltage ground and long time pick-up.
Figure 8:
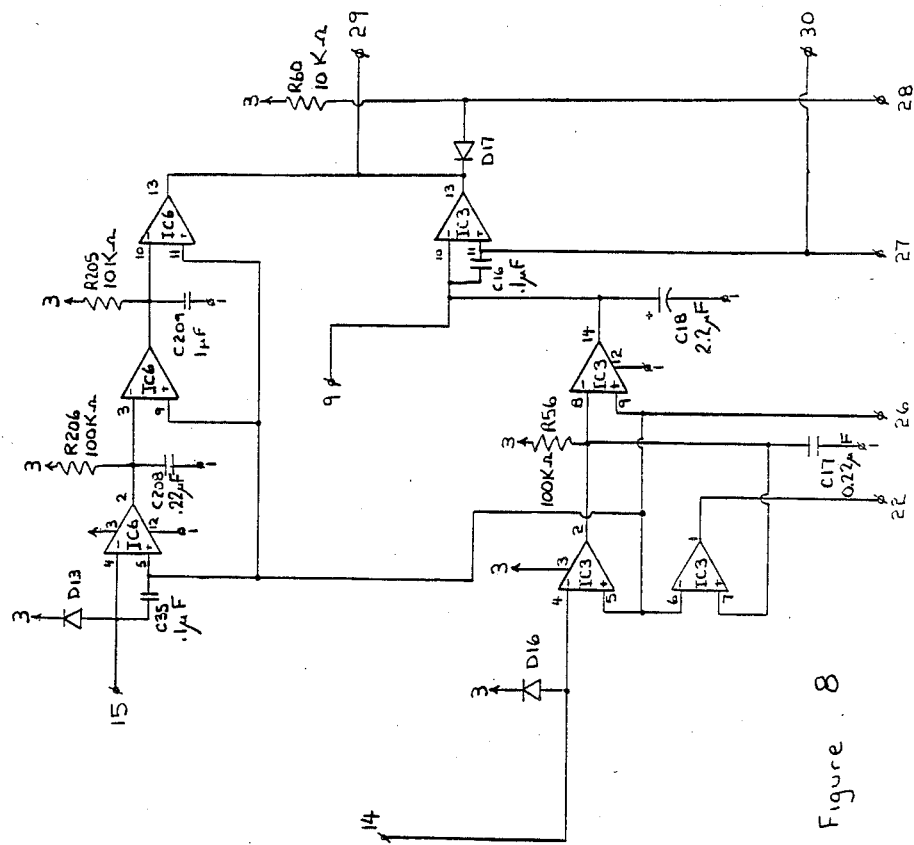
FIG. 8 illustrates comparator circuits for instantaneous and short time for reference voltage.
Figure 9:
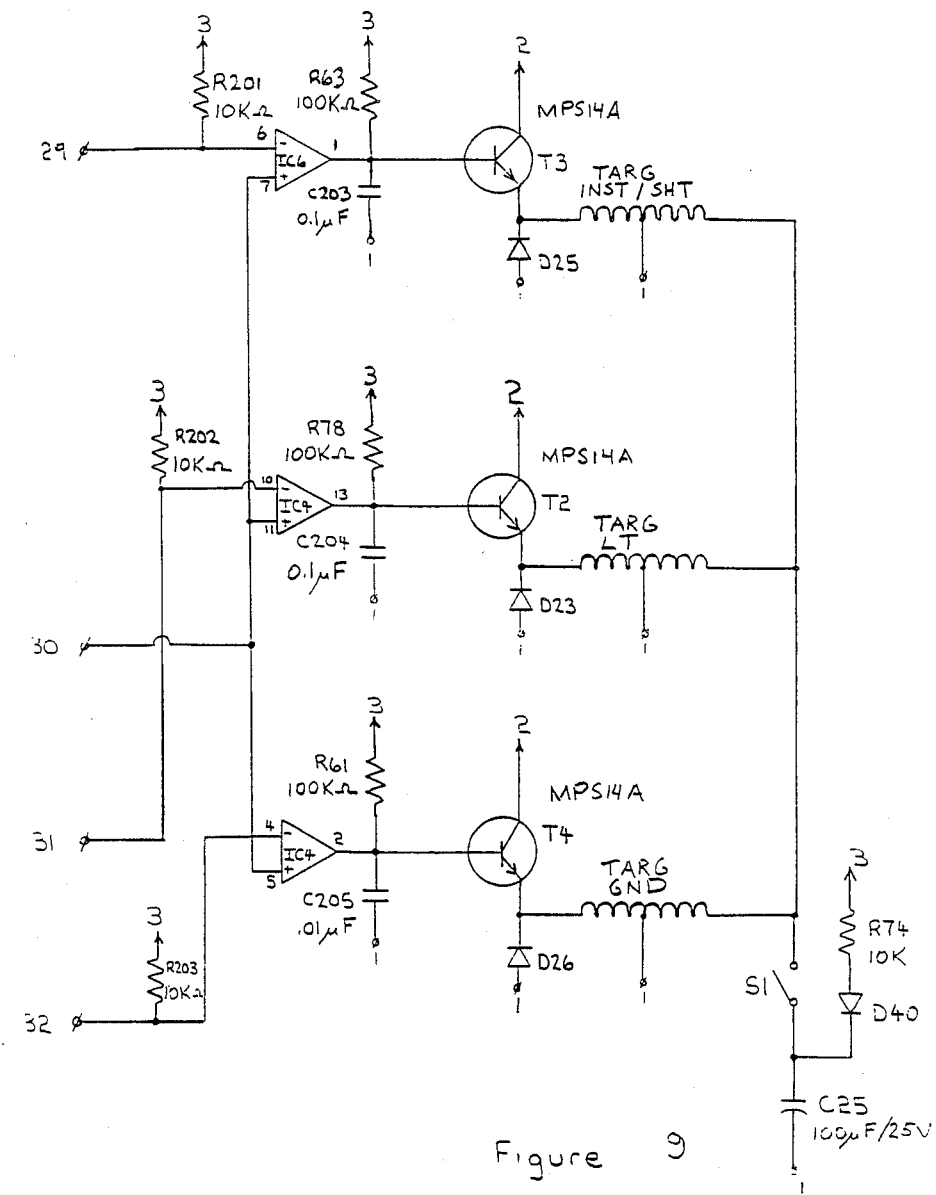
FIG. 9 illustrates the target circuitry.
Figure 10:
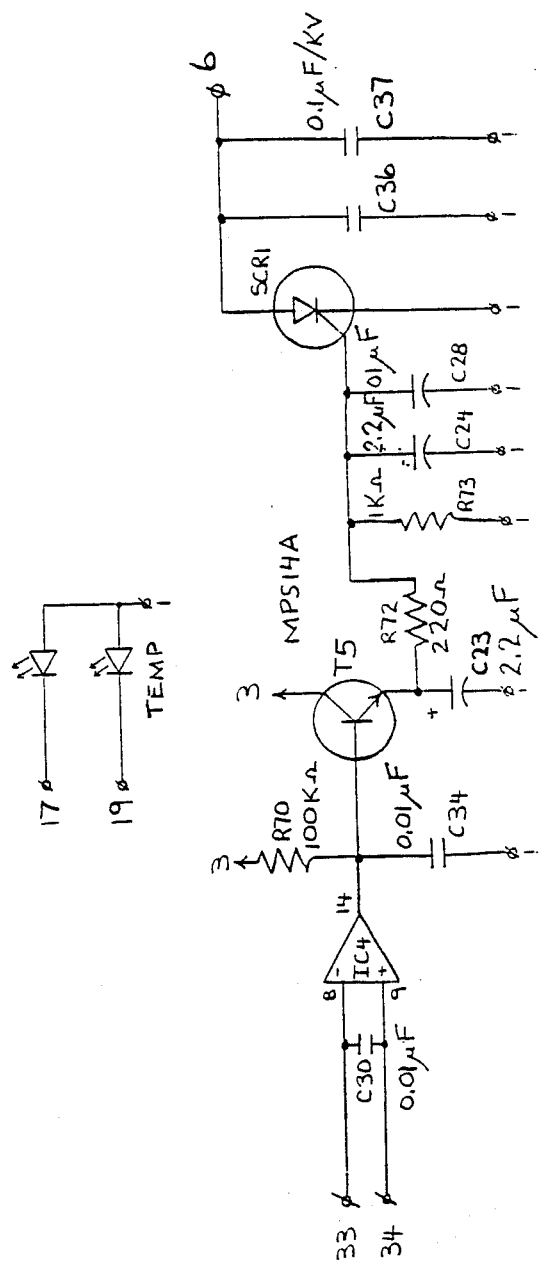
FIG. 10 illustrates circuitry for signal to actuator.
Figure 11:
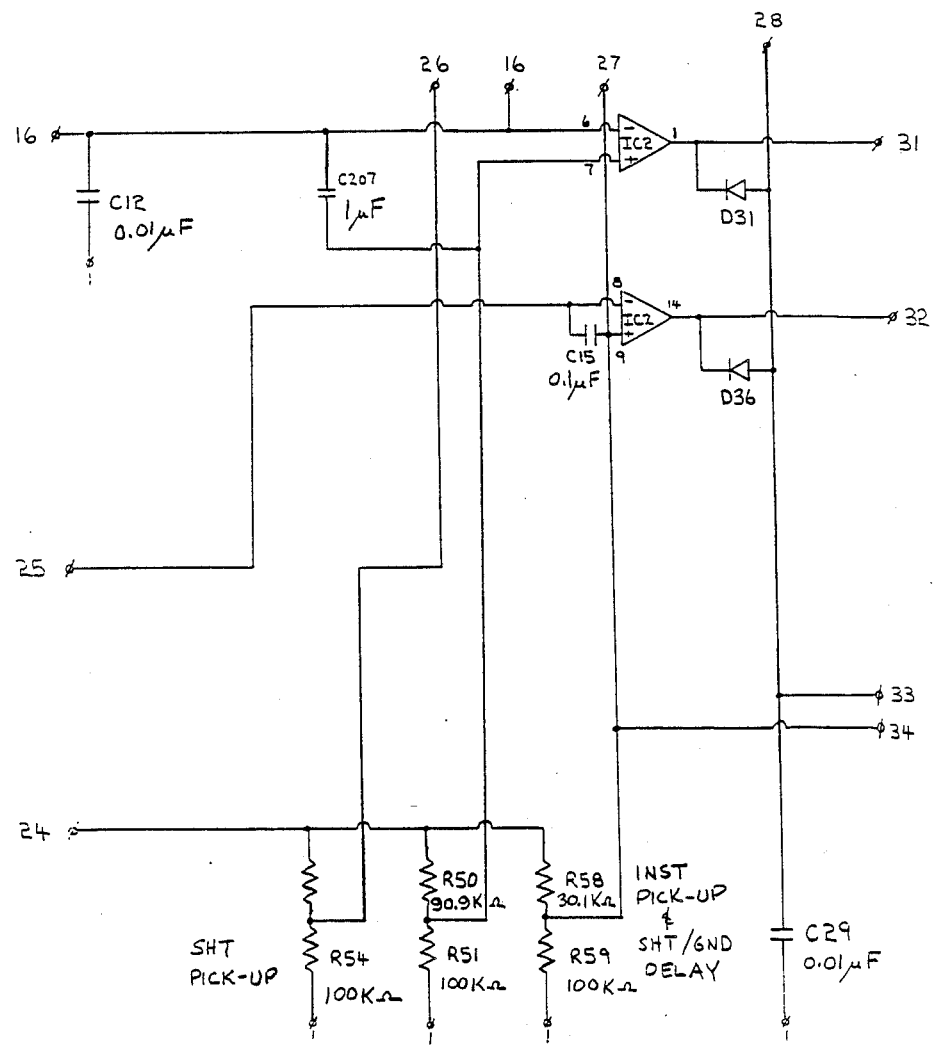
FIG. 11 illustrates circuitry for reference voltage for all functions.

As best illustrated in FIG. 2, Zener diodes Z01, Z02, Z04 and Z06 are used in reverse mode so as to drop the voltage substantially without resistive burden. FIG. 2 shows that Zener diode Z01 has a rating of 33 volts. If Zener diode Z01 was used in the normal mode once the current applied to the anode side reached 33 volts, Zener diode Z01 would open or gate to let all of the voltage through. In the invention disclosed herein Zener diode Z01 is utilized in the reverse mode so that when the input voltage applied to the cathode side of the Zener diode Z01 reached the rating of 33 volts, Zener diode Z01 will allow only the excess through. For example, if an input voltage of 100 volts is applied to the cathode side of Zener diode Z01, a reference voltage of 67 volts passes through. Therefore the use of Zener diode Z01 in the reverse mode substantially eliminates wave distortions on the line.

Zener diode Z01 is used for giving a voltage drop of 33 volts for the phase voltage without substantially adding any resistive burden.

Zener diode Z02 is used for giving voltage drop of 20 volts without substantially adding any resistive burden for powering the static indicators.

Zener diode Z04 is used for giving a voltage drop of 30 volts without substantially adding any resistive burden and thus providing an adjustment of the phase voltage.

Zener diode Z06 is used for providing a voltage drop of 33 volts for the ground voltage without substantially adding any resistive burden.

Figure 13:
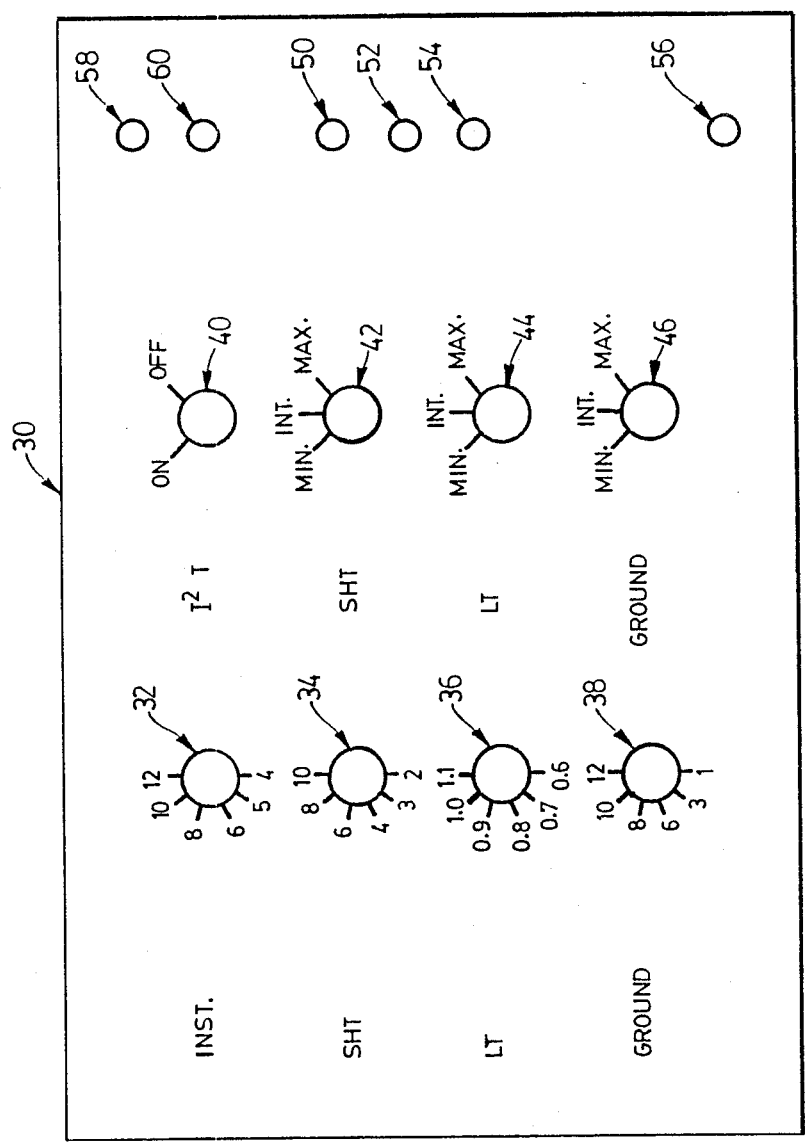
FIG. 13 is a top plan view of the control panel of the programmable logic trip device.

FIG. 13 shows in greater detail the control panel 30 of the programmable logic control device 2.

The control panel 30 includes an adjustable Instantaneous Pick-up Control Knob 32, adjustable Short Time Control Knob 34, an adjustable Long Time Control Knob 36 and an adjustable Ground Pick-up Control Knob 38.

Instantaneous Pick-Up

The Instantaneous Pick-up Control Knob 32 is utilized to select the level at which the circuit breaker 5 will be substantbially instantaneously activated by the trip device 4. In other words, once the current $I_1$ in conductor 6 reaches the level selected on the Instantaneous Pick-up Control Knob 32, the output circuit is triggered so as to enable the power supply from the sensor 10 to activate the trip device 4 and open the circuit breaker 5. The Instantaneous Pick-up Control Knob 32 is adjustable in several stages. For example, the Instantaneous Pick-Up Control Knob 32 illustrated in FIG. 13 is adjustable in 6 stages of 4, 5, 6, 8, 10 or 12 times the ampere-tap chosen. However such increment of stages may have other values depending on the value of the resistors selected in FIG. 3.

For example, if the ampere-tap is selected for 800 amps and one selects the setting 4 on Instantaneous Pick-up Control Knob 32, the circuit breaker 5 will be substantially instantaneously activated once the current $I_1$ reaches a level of 3,200 amps.

Figure 14:
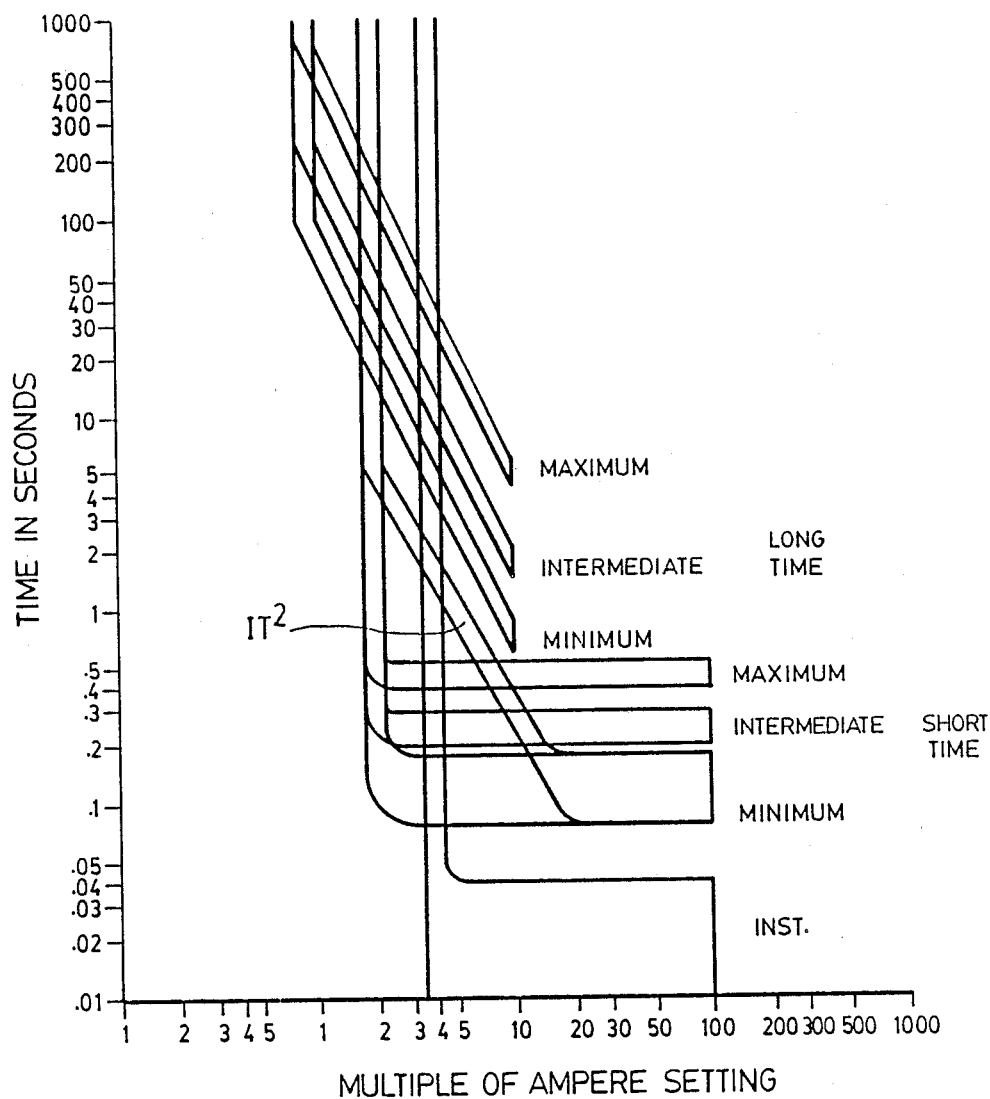
FIG. 14 is a graph showing the Long Time, Short Time and Instantaneous Time current characteristics of the programmable logic control device.

FIG. 14 more fully particularizes the time-current characteristics of the instantaneous trip of the programmable logic control device 2.

Furthermore, the programmable logic control device 2 also includes an $I^2T$ On-Off switch 40 so as to enable the user to switch into or out of the time current characteristics of $I^2T$ illustrated in FIG. 14.

Short Time Pick-Up

The Short Time Pick-up Control Knob 34 is utilized to select the level at which the short time pick-up circuit will be activated. For example, if the Short Time Pick-up Control Knob 34 is selected at the setting 2, and the ampere-tap selected at 800 amps, then the short time pick-up circuits will be activated when $I_1$ in conductor 6 reaches 1,600 amps.

The Short Time Pick-up Control Knob 34 shown in FIG. 13 is adjustable to 2, 3, 4, 6, 8 and 10 times the ampere-tap chosen. However such increment of stages may have other values depending on the value of the resistors selected in FIG. 3.

Furthermore, programmable logic control device 2 also includes a Short Time Delay knob 42 which may be adjusted so as to select a minimum, intermediate or maximum setting which corresponds to selected time settings of the time delay circuits 18.

FIG. 14 more fully particularizes the time current characteristics of the Short Time Pick-up of the programmable logic control device 2.

In our example, if we select Short Time Delay knob 42 to minimum and the Short Time Pick-up Knob at a setting of 2, then the magnetic latch 4 will be tripped if $I_1$ reaches 1,600 amps for a time period of approximately 0.1 seconds as shown in FIG. 14. It should be noted that the values illustrated in FIG. 14 have a tolerance of plus or minus 15 percent.

Long Time Pick-Up

The Long Time Pick-up Control Knob 36 is utilized to select the level at which the long time pick-up circuits will be activated. For example, if the Long Time Pick-up Control Knob 36 is selected at 1.0 and the ampere-taps selected at 800 amps then the long time pick-up circuit will be activated when $I_1$ in conductor 6 reaches 800 amps.

Furthermore, programmable logic control device 2 also includes a Long Time Delay Control Knob 44 which may be adjusted so as to select a minimum, intermediate or maximum setting which corresponds to selected time settings of the time delay circuits 18.

FIG. 14 more fully particularizes the time current characteristics of the Long Time Pick-up of the programmable logic control device 2.

In our example, if we set Long Time Control Knob to intermediate and the Long Time Pick-up Control Knob 36 to 1.0 then the magnetic latch 4 will be tripped if $I_1$ reaches 800 amps for a time period of approximately 250 seconds.

The Long Time Pick-up Control Knob in FIG. 13 is adjustable in several stages. For example, the Long Time Pick-Up control Knob 36 illustrated in FIG. 13 is adjustable in 6 stages of 0.6, 0.7, 0.8, 0.9, 1.0 and 1.1 times the ampere-tap chosen. However such increment of stages may have other values depending on the value of the resistors selected in FIG. 4.

Ground Pick-Up

The Ground Pick-up function is optional and may be included in the programmable logic control device 2 where it is desirable to protect electrical systems against faults to ground. Such ground faults including arcing faults which result in currents having a magnitude which is less than the normal load current $I_1$ but require detection due to the damage which may result from the arc.

It should be noted that the regulatory bodies in the North American market place require that the maximum ground protection be set at 1200 amps.

The Ground Pick-up current settings are independent of the Instantaneous Time, Short Time or Long Time current characteristics and measure the real value.

The adjustable Ground Pick-up Control Knob 38 may be adjusted as shown in FIG. 4 to 1, 3, 6, 8, 10 and 12 times 100 amperes so as to match the system.

Furthermore, programmable logic control device 2 includes a Ground Delay Control Knob 46 which may be adjusted so as to select a minimum, intermediate or maximum time delay setting which corresponds to selected time setting invervals of the time delay circuits 18.

Figure 15:
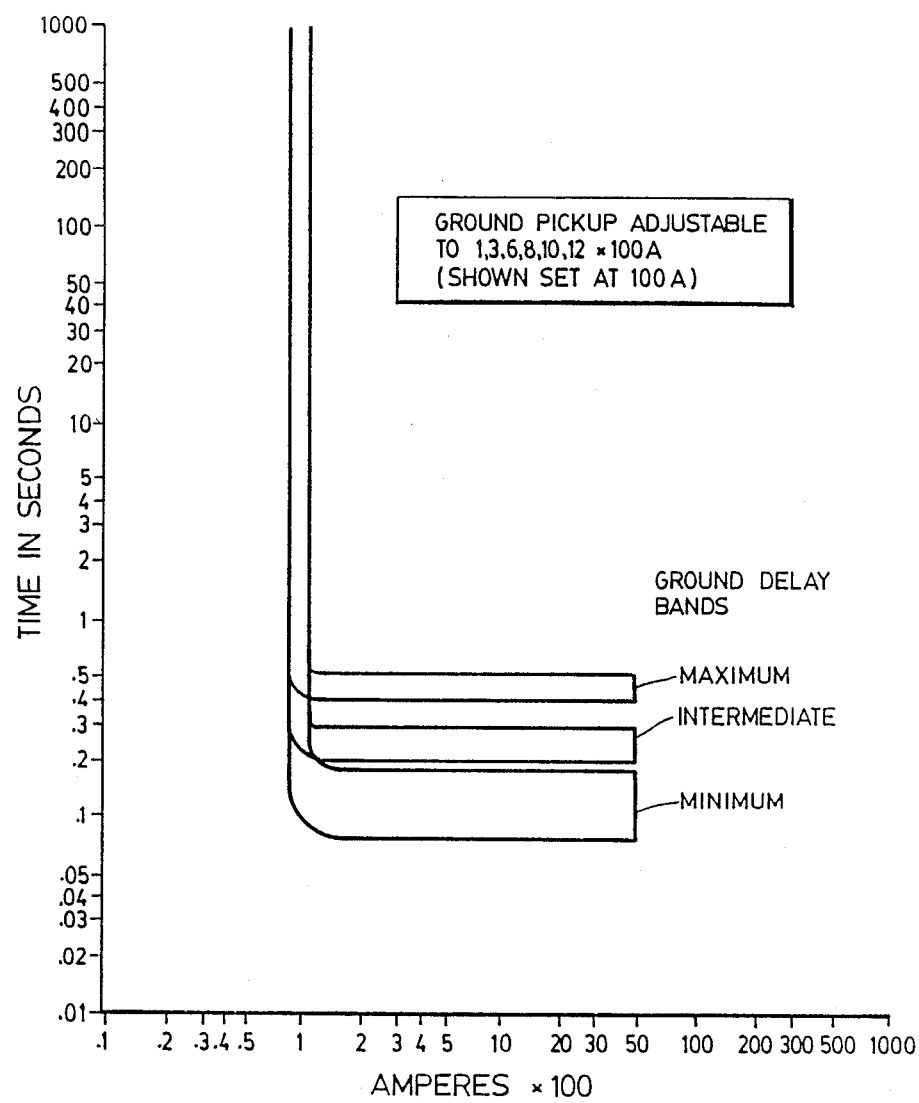
FIG. 15 is a graph showing the Ground Time Characteristics of the programmable logic control device.

FIG. 15 more fully particularlizes the time current characteristics of the ground pick-up of the programmable logic trip device 2.

For example, if we set adjustable Ground Pick-up Control Knob 38 at 3 and Ground Time Delay Control Knob 46 at intermediate then the magnetic latch 4 would be tripped if $I_1$ reaches 300 amps for a period of approximately 0.2 seconds.

Programmable Logic Control

The programmable logic control device 2 disclosed herein allow the user to quickly select the desired control parameter of instantaneous time, short time, long time and ground faults and to change such parameters by adjusting the Control Knobs as well as the ampere-taps. The programmable logic control device described herein is therefore universal in the sense that one logic device can be used to effectively monitor electrical systems over a range of electrical characteristics by selecting the appropriate ampere tap and control knobs which are incorporated in the device 2 rather than utilizing a number of current transformers or logic devices. In the preferred embodiment disclosed herein the programmable logic control device may be universally utilized to monitor currents between a range of 30 to 4400 amps.

Moreover, if all of the control parameters are set then the trip device 4 will be activated to open circuit breaker 5 when primary current $I_1$ in conductor 6 reaches the value of the least severe parameter selected for instantaneous time, short time, long time or ground fault.

Furthermore the programmable logic control device 2 will not trip the circuit breaker 5 when any of the adjusting Control Knobs 32, 34, 36 or 38 are moved from one setting to another since the setting will be automatically raised to the highest value when the Knob is between settings.

Indicators

The programmable logic control device 2 also may be equipped with optional indicators or targets, namely an instantaneous/short time target 50, long time target 52 and ground target 54. Target 50 will light up or indicate that the circuit breaker 5 has been tripped when current $I_1$ has reached a condition corresponding either to the selected instantaneous current or short time current. Target 52 will light up or indicate that the circuit breaker 5 has been tripped when current $I_1$ has reached a condition corresponding to the long time current. Target 54 will light up or indicate a ground fault in the system. Such targets may be located remotely from the programmable logic control device 2.

The programmable logic control device 2 may also be equipped with a target release device or button 56 so as to clear any of the targets 50, 52 or 54.

The programmable logic control device 2 may also be equipped with an overload light 58 which will be activated in the event that the electrial system or primary current $I_1$ in conductor 6 is subjected to an overload condition. An optional temperature indicator 60 may be provided which will light up once the electrical system overheats to a predetermined adjustable temperature.

Although the preferred embodiment as well as the operation and use have been specifically described in relation to the drawings, it should be understood that variations in the preferred embodiment could easily be achieved by a man skilled in the art without departing from the spirit of the invention. Accordingly, the invention should not be understood to be limited to the exact form revealed by the drawings.

The emodiments of the invention in which an exclusive property or privilege is claimed are defined as follows:

1. A universal programmable logic control device for monitoring the current of an electrical circuit and for signalling a circuit control device, said programmable logic control device including:
   (a) electrical power means for activating said circuit control device;
   (b) electrical circuitry means for monitoring said current in said electrical circuit, said electrical circuitry means including:
      (i) adjustable electrical signal input circuitry means to match said programmable logic control device to said current in said electrical circuit;
      (ii) adjustable pick-up circuitry means for adjusting the level of the said current monitored in said electrical circuit;
      (iii) adjustable time circuitry means for adjusting the time duration of said selected level of current so as to command said electrical power means to activate said control device when said current in said electrical
      (iv) means for controlling the level of voltage applied to said adjustable pick-up circuitry means and time circuitry means substantially without resistive burden, said means passing a reference voltage which is less than an input voltage to said means.

2. A programmable logic control device as claimed in claim 1 wherein said adjustable signal input circuitry means includes selectable ampere-taps.

3. A programmable logic control device as claimed in claim 2 wherein said programmable device is adjustable to monitor said current in said electrical circuit between a range of approximately 30 amps and 4400 amps.

4. A programmable logic control device as claimed in claim 3 wherein said circuit control device comprises an electrical trip device for activating a circuit breaker in said electrical system.

5. A universal programmable logic control device as claimed in claim 1 wherein said voltage control means includes means to drop said voltage applied to said adjustable pick-up circuitry means and said time circuitry means.

6. A universal programmable logic control device as claimed in claim 5 wherein said voltage control and dropping means comprises zener diode means disposed in reverse mode so as to approximately linearly monitor said current in said circuit.

7. A universal programmable logic control device as claimed in claim 6 wherein said zener diode means is selected so that said universal programmable logic controls root mean square current.

8. A programmable logic control device as claimed in claim 11 wherein said electrical power means and said electrical circuitry means are connected in parallel.

9. A universal programmable logic control device as claimed in claim 7 including ground fault circuitry means for activating said circuit control device in the event of a ground fault in said electrical circuit.

10. A universal programmable logic control device for monitoring the current in an electrical circuit and for signalling a trip device for activating a circuit breaker in said electrical circuit, said programmable logic control device including:

(a) electrical power means for signalling said trip device for activating said circuit breaker;

(b) electrical circuitry means for monitoring the value of current in said electrical circuit, said electrical circuitry means including:

(i) adjustable ampere tap means to match said programmable logic control device to said current in said electrical circuit;

(ii) adjustable pick-up circuitry means for adjusting the level of current monitored in said electrical circuit;

(iii) adjustable time circuitry means for adjusting the time duration of said selected level of current so as to command said electrical power means to signal said trip device to activate said circuit breaker when said current in said circuit reaches said selected level and time duration;

(iv) means for controlling the level of voltage applied to said adjustable pick-up circuitry means and time circuitry means substantially without resistive burden, said means passing a reference voltage which is less than an input voltage to said controlling means.

11. A universal programmable logic control device as claimed in claim 10 wherein said voltage control means includes means to drop said voltage applied to said adjustable pick-up circuitry means and said time circuitry means.

12. A universal programmable logic control device as claimed in claim 11 wherein said voltage control and dropping means comprises zener diode means disposed in reverse mode so as to approximately linearly monitor said current in said circuit.

13. A universal programmable logic control device as claimed in claim 12 wherein said zener diode means is selected so that said universal programmable logic controls root mean square current.

14. A universal programmable logic control device for monitoring the current of circuit and for signalling a circuit control device, said programmable logic control device including:

(a) electrical power means for activating said circuit control device;

(b) electrical circuitry means for monitoring said current in said electrical circuit, said electrical circuitry means including:

(i) adjustable pick-up circuitry means for adjusting the level of said current monitored in said electrical circuit;

(ii) adjustable time circuitry means for adjusting the time duration of said selected level of electrical current so as to command said electrical power means;

(iii) means for controlling the level of voltage applied to said adjustable pick-up circuitry means and time circuitry means substantially without resistive burden, said means passing a reference voltage which is less than an input voltage to said means.

* * * * *